United States Patent [19]
Akiyama et al.

[11] Patent Number: 5,026,792
[45] Date of Patent: Jun. 25, 1991

[54] RESIN COMPOSITION

[75] Inventors: Saburo Akiyama, Tokyo; Naoyuki Murakami; Kazuo Kitamura, both of Mihara, all of Japan

[73] Assignee: Teijin Chemicals, Ltd., Tokyo, Japan

[21] Appl. No.: 460,055

[22] PCT Filed: May 31, 1989

[86] PCT No.: PCT/JP89/00546
§ 371 Date: Mar. 7, 1990
§ 102(e) Date: Mar. 7, 1990

[87] PCT Pub. No.: WO89/12078
PCT Pub. Date: Dec. 14, 1989

[30] Foreign Application Priority Data

Jun. 1, 1988 [JP] Japan ................................. 63-132604

[51] Int. Cl.$^5$ ............................................. C08L 69/00
[52] U.S. Cl. ....................................... 525/468; 525/146
[58] Field of Search ................................ 525/146, 468

[56] References Cited

U.S. PATENT DOCUMENTS

| 3,821,326 | 6/1974 | Lauchlan | 525/146 |
| 4,252,916 | 2/1981 | Mark | 525/146 |
| 4,617,350 | 10/1986 | Maeda | 525/200 |

FOREIGN PATENT DOCUMENTS 008244  1/1982  Japan ................................. 525/146

Primary Examiner—John C. Bleutge
Assistant Examiner—David Buttner
Attorney, Agent, or Firm—Sherman and Shalloway

[57] ABSTRACT

The present invention provides a resin composition which is a composition of 30 to 99.5 wt. % of an aromatic polycarbonate and 70 to 0.5 wt. % of a vinylidene fluoride-hexafluoroacetone copolymeric elastomer.

This resin composition is excellent in moldability and processability, heat resistance and impact resistance, and useful as an engineering plastic.

3 Claims, No Drawings

RESIN COMPOSITION

TECHNICAL FIELD

The present invention relates to a polycarbonate resin composition. More specifically, the invention relates to a polycarbonate resin composition excellent in moldability and processability and in heat resistance and also excellent in impact resistance.

PRIOR ART

Although polycarbonates are resins excellent as engineering plastics, they have disadvantages of bad moldability and large thickness dependency in impact resistance and the like, and thus improvement of these disadvantages has been desired.

Heretofore, various proposals have been made for improvement of the moldability of polycarbonates and the impact resistance of thick moldings thereof. For example, it was proposed as a method for improvement of thickness dependency of the impact resistance of polycarbonates and the fluidity thereof in a melted state to compound As resins and MBS resins into polycarbonates (Japanese Patent Publication No. 503/1977). Further, it was proposed to compound MBS resins into polycarbonates (Japanese Patent Publication No. 71/1964). However, both methods could hardly give resin compositions having a high heat distortion temperature.

Further, although a composition comprising polycarbonate(s), and polytetrafluoroethylene was proposed (Japanese Patent Publication No. 858/1973), its impact resistance was not sufficient.

Further, a composition comprising polycarbonate(s) and polyvinylidene fluoride was proposed for the purpose of improvement of light diffusivity and abrasion resistance of polycarbonates (Japanese Laid-Open Patent Publication Nos. 94952/1980 and 253651/1987), and a composition comprising polycarbonate(s) and vinylidene fluoride-hexafluoropropylene copolymer(s) was proposed for the purpose of improvement of the impact resistance and thickness dependency of polycarbonates (Japanese Laid-Open Patent Publication No. 54457/1974). However, all these resin compositions do not necessarily have satisfactory impact resistance.

THE OBJECT OF THE INVENTION

The object of the invention is to provide a resin composition excellent not always in moldability and processability and in heat resistance but also in impact resistance.

CONSTITUTION OF THE INVENTION

The present invention provides a resin composition comprising 30 to 99.5 wt. %, preferably 50 to 99 wt. %, of an aromatic polycarbonate and 70 to 0.5 wt. %, preferably 50 to 1 wt. %, of a fluorine type copolymeric elastomer obtained by copolymerizing vinylidene fluoride and hexafluoroacetone.

The polycarbonate used in the invention can be obtained by reaction of a bisphenol compound with phosgen or a carbonic diester. 2,2-Bis(4-hydroxyphenyl) propane (hereinafter abbreviated as bisphenol A) is particularly preferred as the bisphenol compound, but other bisphenol compounds may be used wherein a part of or whole bisphenol A is substituted by another bisphenol compound. Examples of bisphenol compounds other than bisphenol A include, for example, hydroquinone, resorcinol, 4,4'-di-hydroxydiphenyl, bis(4-hydroxyphenyl)alkane, bis(4-hydroxyphenyl)cycloalkane, bis(4-hydroxyphenyl)sulfide, bis(4hydroxyphenyl)ether, bis(4-hydroxyphenyl)ketone, bis(4hydroxyphenyl)sulfone and bis(4-hydroxyphenyl)sulfoxide, and alkyl-, aryl- and halogen-substituted derivatives thereof, etc.

The copolymer of vinylidene fluoride and hexafluoroacetone used in the invention can be obtained by copolymerizing 40 to 90 mol % of vinylidene fluoride and 60 to 10 mol % of hexafluoroacetone in the presence of a usual radical initiator according to the solution polymerization or bulk polymerization method. Proper polymerization temperature in preparation of the copolymer is 0 to 70° C. The ratio of repetition units in the obtained copolymer is usually about 60 to 95 mol % of vinylidene fluoride to about 40 to 5 mol % of hexafluoroacetone. Proper limiting viscosity [n] of the copolymer at 30° C. using a dimethylacetamide solution thereof is 0.5 to 2.0 dl/g. Copolymers of vinylidene fluoride and hexafluoroacetone can be obtained for example from Central Glass Co., Ltd.

The copolymer of vinylidene fluoride and hexafluoroacetone is used in an amount of 0.5 to 70 wt. %, preferably 1 to 50 wt. % based on the total weight of the copolymer and polycarbonate. In case of the use amount being below 0.5 wt. % no improvement of impact resistance is observed, and on the other hand in case of beyond 70 wt. % physical properties (particularly, tensile strength, tensile elongation, flexural strength and impact strength) are strikingly lowered, and thus both cases are undesirable.

The resin composition of the invention can be prepared according to an optional method. For example, a method is general wherein a mixer such as an extruder, kneading roller or banbury mixer is used.

It is possible to add to the composition of the invention additives such as a coloring agent, a filler, a plasticizer, a stabilizing agent and a glass fiber in amounts in the range without largely impairing characteristics of the composition.

EFFECT OF THE INVENTION

Because of use of a fluorine type copolymeric elastomer the composition of the present invention has excellent characteristics unobtainable by usual compositions, for example, that it maintains excellent heat resistance (particularly, deflection temperature under load) of polycarbonates and molding and processing thereof are very easy and in addition it has an improved thickness dependency of impact resistance and an appearance of beautiful pearl color.

EXAMPLE

Examples 1 to 3

Granules of copolymer (A) of vinylidene and hexafluoroacetone (produced by Central Glass Co., Ltd., copolymerization molar ratio vinylidene fluoride/hexafluoroacetone =91.0/9.0, [n]=1.10 dl/g) were mixed with pre-dried commercially available polycarbonate powder (produced by Teijin Chemicals, Ltd., trade name PANLITE L-1225 WP) in compositions indicated in Table 1, and each mixture was extruded through an extruder (30 mm vent-type extruder made by Nakatani Co., Ltd., cylinder temperature 250° C.) to obtain pellets. Each pellet obtained had a lustrous milk white pearl-like appearance. After drying at 120° C. for 3 hours, each pellet was molded into a specimen, using an injection molding machine (J-120 SA made by The Japan Steel Works, Ltd.), under the conditions that cylinder temperature was 250° C. and injection mold temperature was 70 ° C. Physical properties of each specimen were exhibited in Table 1.

Comparative example 1

For comparison, the polycarbonate alone used in Example 1 was, after drying, extruded through the extruder (cylinder temperature 260° C.) to obtain pellets; each pellets was, after drying at 120° C. for 3 hours, molded into a specimen under the conditions that cylinder temperature was 260° C. and injection mold temperature was 70° C.; and the obtained specimens were measured for the various physical properties, respectively. The resulting results were shown in Table 1.

ene (produced by Daikin Industries, Ltd., trade name DAIEL T-530) were mixed with 90 wt. parts of the same polycarbonate as used in Example 1, and specimens for measurement were molded therefrom according to the method of Example 1 and measured for the various physical properties. The resulting results were indicated in Table 1.

Comparative example 4

Powder (10 wt. parts) of commercially available polytetrafluoroethylene (produced by Daikin Industries, Ltd., trade name DAIFLON F-103) was mixed with 90 wt. parts of the same polycarbonate as used in Example 1, and specimens for measurement were molded therefrom according to the method of Example 1 and measured for the various physical properties. The resulting results were shown in Table 1.

TABLE 1

|  |  | Unit | Measuring method (ASTM) | Example 1 | Example 2 | Example 3 | Comparative Example 1 | Comparative Example 2 | Comparative Example 3 | Comparative Example 4 |
|---|---|---|---|---|---|---|---|---|---|---|
| Composition | Polycarbonate | Wt % | — | 90 | 70 | 50 | 100 | 90 | 90 | 90 |
|  | Copolymer (A) | Wt % | — | 10 | 30 | 50 | — | — | — | — |
|  | PvdF | Wt % | — | — | — | — | — | 10 | — | — |
|  | Copolymer (B) | Wt % | — | — | — | — | — | — | 10 | — |
|  | PTFE | Wt % | — | — | — | — | — | — | — | 10 |
| Physical property | Tensile Yield strength | Kgf/cm$^2$ | D638 | 580 | 470 | 380 | 630 | 600 | 570 | 560 |
|  | Breaking strength | Kgf/cm$^2$ | D638 | 640 | 360 | 250 | 710 | 670 | 630 | 370 |
|  | Elongation | % | D638 | 125 | 20 | 30 | 130 | 125 | 120 | 50 |
|  | Flexure Strength | Kgf/cm$^2$ | D790 | 820 | 670 | 560 | 900 | 890 | 800 | 800 |
|  | Flexural modulus | Kgf/cm$^2$ | D790 | 20,600 | 17,200 | 15,500 | 22,400 | 22,000 | 20,000 | 22,000 |
|  | Impact Izot notched ¼″ t | Kgf·cm/cm | D256 | 69 | 55 | 52 | 12 | 7 | 16 | 12 |
| HDT (264 Psi) |  | °C. | D648 | 132 | 131 | 130 | 133 | 134 | 135 | 135 |

Note
Copolymer (A): Copolymer of vinylidene fluoride and hexafluoroacetone
PvdF: Poly(vinylidene fluoride)
Copolymer (B): Copolymer of vinylidene fluoride and hexafluoropropylene
PTFE: Polytetrafluoroethylene Comparative example 2

Pellets (10 wt. parts) of commercially available poly(vinylidene fluoride)(produced by Kureha Chemical Industry Co., Ltd., trade name KF Polymer 1000) were mixed with 90 wt. parts of the same polycarbonate as used in Example 1, and specimens for measurement were molded therefrom according to the method of Example 1 and measured for the various physical properties. The resulting results were shown in Table 1.

Comparative example 3

Pellets (10 wt. parts) of commercially available copolymer of vinylidene fluoride and hexafluoropropyl-

We claim:

1. A resin composition comprising 30 to 99.5 wt. % of an aromatic polycarbonate and 70 to 0.5 wt. % of a fluorine type copolymeric elastomer obtained by copolymerization of vinylidene fluoride and hexafluoroacetone.

2. The composition of claim 1 comprising 50 to 99 wt. % of the aromatic polycarbonate and 50 to 1 wt. % of the fluorine type copolymeric elastomer.

3. The composition of claim 1 or 2 wherein the fluorine type copolymeric elastomer is one obtained by copolymerization of 40 to 90 mol % of vinylidene fluoride and 60 to 10 mol % of hexafluoroacetone.

* * * * *